Figure 1:
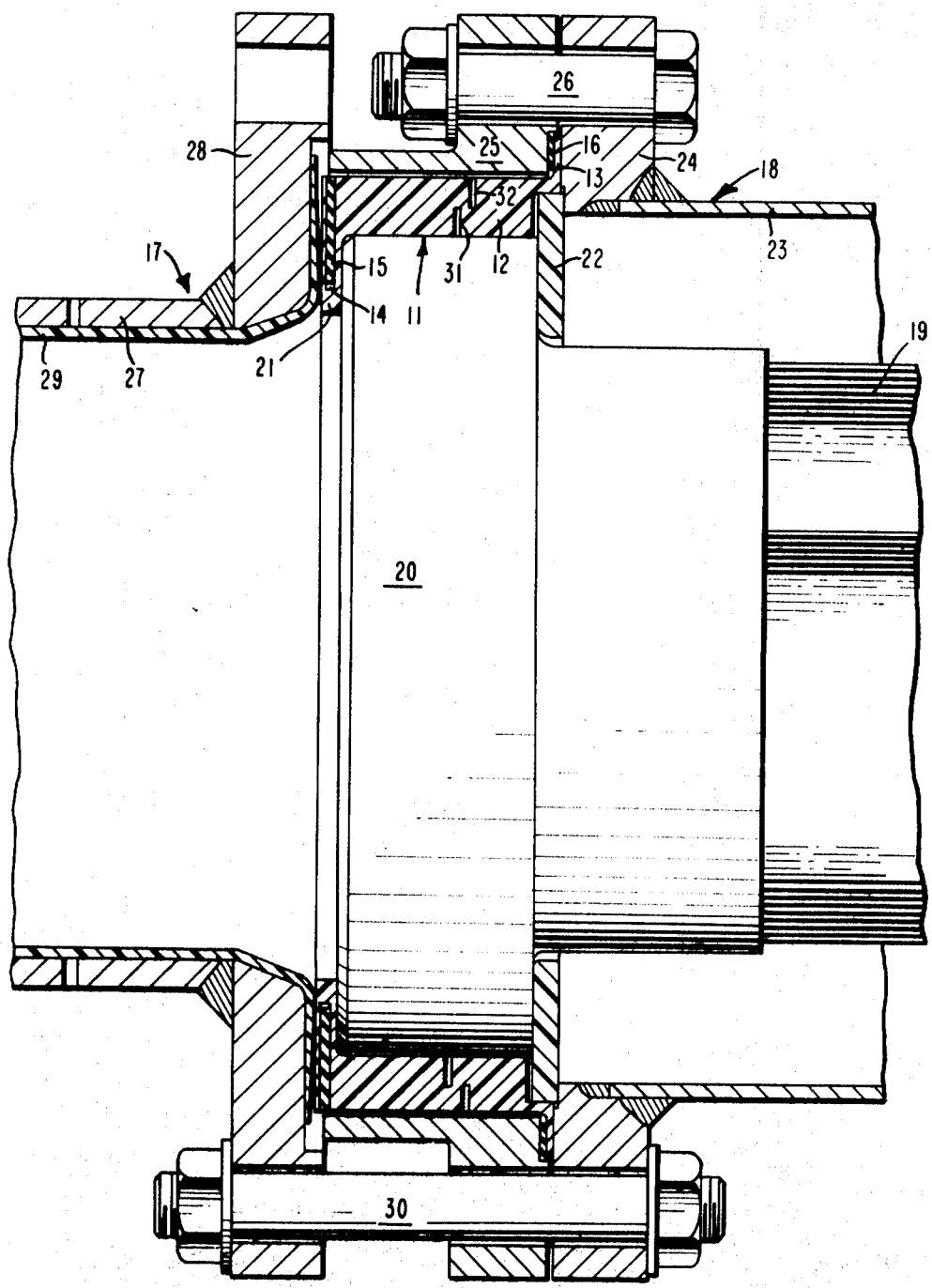

United States Patent

[11] 3,610,639

[72] Inventor Louis T. Staats, Jr.
Lincoln University, Pa.
[21] Appl. No. 858,922
[22] Filed Sept. 18, 1969
[45] Patented Oct. 5, 1971
[73] Assignee E. I. du Pont de Nemours and Company
Wilmington, Del.

[54] CORROSION RESISTANT SEALING MEMBER
10 Claims, 2 Drawing Figs.
[52] U.S. Cl. .................................................. 277/214,
277/215, 277/227
[51] Int. Cl. ..................................................... F16j 15/06
[50] Field of Search .......................................... 277/58,
101, 214, 215, 227, 228, 178, DIG. 6

[56] References Cited
UNITED STATES PATENTS
2,868,575 1/1959 Hawxhurst .................. 277/228
2,951,721 9/1960 Asp ............................. 277/DIG. 6

Primary Examiner—Robert J. Smith
Attorney—Wilkin E. Thomas, Jr.

ABSTRACT: A corrosion-resistant sealing member comprising: a relatively rigid cylindrical member, made from a corrosion-resistant material deformable under applied pressure, with a passage connecting its ends, a flange at one end extending outward from its outer periphery, and a groove at the other end extending inward from its outer periphery in a manner such as to provide a thin flexible wall between the groove and the adjacent end of the cylindrical member; a first gasket disposed within the groove; and a second gasket disposed about the cylindrical member abutting the flange, both gaskets being made from materials that are resilient over the range of temperature variation to which they are subjected.

INVENTOR
LOUIS T. STAATS, JR.

BY *Wilkin E. Thomas Jr.*

AGENT

3,610,639

CORROSION RESISTANT SEALING MEMBER

BACKGROUND OF THE INVENTION

This application relates to corrosion-resistant sealing members. More particularly it relates to corrosion-resistant sealing members useful in a plastic tube heat exchanger adapted to operate on corrosive fluids.

When two conduits used to pass corrosive fluids are joined, the seal between them as well as the internal surface of the conduits must be made from a material which is resistant to the corrosive fluid. Normally, this means that the seal must be made from a deformable thermoplastic rather than a resilient elastomer. Since the material from which the conduits are made is usually a metal, perhaps with a plastic liner, having a coefficient of thermal expansion much less than that of the thermoplastic, if the corrosive fluid is subjected to large temperature variations, then the thermoplastics will take a set at the high temperature under the compression due to the difference in thermal expansion, and the set will remain when the temperature of the fluid is decreased, causing the seal to leak. This can in part be overcome by using a resilient gasket either completely or partially encapsulated by the thermoplastic, but in those cases where the connection between the conduits is provided for the purpose of supporting an internal structure between the conduits, then the necessity for two seals, one on either side of the structure, and the inconvenience of assembling such a combination makes an integrated structure desirable and in many cases necessary. One case in which this situation arises is in a plastic tube heat exchanger where one conduit supplied the tube-side fluid, the other conduit supplies the shell-side fluid and the structure sealed between the conduits is the tube sleeve for the plastic heat exchanger tubes. In this case, not only must the seals between the two conduits be leaktight in relationship to the exterior of the conduits, but the seal must be leaktight as between the two conduits so that the shell-side fluid and the tube-side fluid will not intermix.

The simple solution that has been arrived at in cases like this is to incorporate resilient regions into a rigid corrosion resistant material that is deformable under applied pressure, so that at higher temperatures the rigid material can expand into the region occupied by the resilient material without compressing and taking a set. The simplest way to accomplish this in a structure such as the tube sleeve of the plastic tube heat exchanger discussed above is to cut grooves into its outer periphery at each end of the tube sleeve and to place resilient gaskets into these grooves. While simple, this solution is not as attractive as it might at first appear, because many of the structures designed to be inserted between such conduits are both difficult and expensive to manufacture. Care must be taken to insure that accidental destruction of the sealing member will not cause complete loss of the structure. In many cases, therefore, it is essential to have a sealing member which is not part of the structure to be sealed between the conduits, and the problem becomes one of constructing a separate sealing member which is as simple, as effective and as corrosion resistant as the integral seal.

It is an object of the present invention, therefore, to provide a corrosion resistant sealing member for connecting conduits adapted to pass corrosive fluids, which will withstand wide variations in temperature without sustaining a leak. It is a further object of the present invention to provide a corrosion-resistant sealing member adapted to connect two conduits together in a manner such as to support a third structure between them, all having leaktight association over a wide variation in temperature. It is a still further object of the present invention to provide a corrosion-resistant sealing member adapted to support and to seal a structure between two conduits in leaktight arrangement over a wide variation in temperature, in which the sealing member is not an integral part of the structure. It is a still further object of the present invention to provide a corrosion-resistant sealing member for use in forming a seal between the shell-side fluid conduit and tube-side fluid conduit of a plastic heat exchanger in a manner such as to support the tube sleeve of a plastic heat exchanger tube between the two conduits.

SUMMARY OF THE INVENTION

These objects are accomplished by providing a corrosion-resistant sealing member comprising: a relatively rigid substantially cylindrical member made from a corrosion-resistant material that is deformable under applied pressure, and first and second circular gaskets made from materials that are resilient over the range of temperature variation to which they are subjected. The cylindrical member has a passage connecting its ends, a flange at one of its ends extending outward from its outer periphery, and a groove at its other end extending inward from its outer periphery in a manner such as to provide a thin flexible wall between the groove and the end of the member adjacent to the groove. The first gasket is disposed within the groove and the second gasket is disposed about the outer periphery of the cylindrical member abutting the flange. In a preferred embodiment, the cylindrical member is made from a thermoplastic, such as "Teflon" fluorocarbon resin and the gaskets are made from a material having a hardness of between 30 and 60 durometers. The sealing member can be adapted to both seal the tube-side and shell-side of the heat exchanger and to support the tube sleeve between them, all in leaktight relationship. In this case, the end of the cylindrical member containing the groove further comprises a flange, extending inward from the inner periphery of the cylindrical member, into which the gasket containing groove extends, to provide a surface for the tube sleeve of the heat exchanger to butt and seal against, giving the sealing member a z-shaped configuration. A separate split-ring retaining ring is also provided at the other end of the seal to firmly seat the tube sleeve within the region formed for it in the sealing member.

Figure 2:
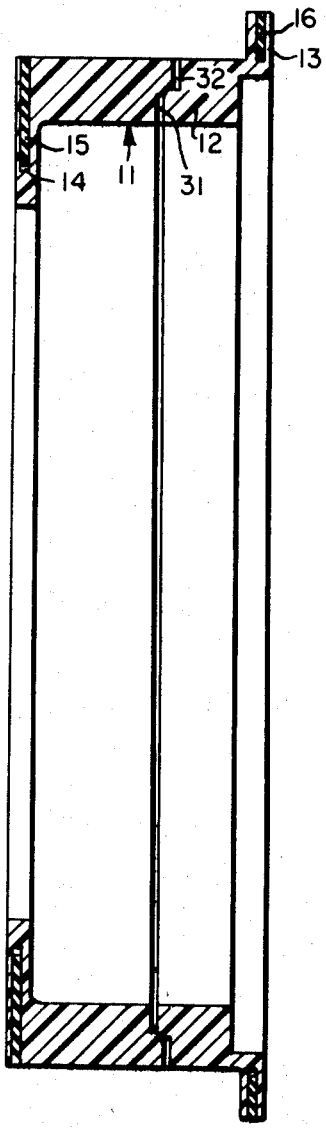

The operation and advantages of the present invention can best be discussed by reference to the following figures wherein:

FIG. 1 is a cross-sectional diagram of one embodiment of the sealing member of the present invention in situ between the tube-side conduit and shell-side conduit of a heat exchanger; and FIG. 2 is a cross-sectional diagram of a second embodiment of the sealing member of the present invention.

DETAILED DISCUSSION OF THE FIGURE

Referring to FIG. 1, the sealing member 11, comprises a substantially cylindrical member 12 with a flange 13 at one end and a groove 14 at the other end, and first and second circular gasket, 15 and 16 respectively. The first gasket 15 is disposed within groove 14 and the second gasket 16 is disposed about the cylindrical member abutting flange 13.

The cylindrical member is made from a relatively rigid material that is deformable under applied pressure and is unaffected by the hot corrosive fluid that flows through conduits 17 and 18. The material must be relatively rigid so that it will withstand the forces involved in the sealing, and it must also be deformable under applied pressure because the seal itself is formed by deformation of the material in the cylindrical member. Usually the cylindrical member is made from a thermoplastic. Those thermoplastics that are particularly resistant to chemical corrosion are the fluorocarbon polymers sold under the trademark Teflon,® comprising polymers of tetrafluoroethylene or copolymers of tetrafluoroethylene and hexafluoropropylene. Other thermoplastics such as polyamides, polyolefins and polyacetals may be suitable under certain circumstances.

Gaskets 15 and 16 are made from materials which are resilient and retain their resiliency over the range of temperature to which they are subjected. Materials with a hardness of between 30 and 60 durometers are suitable. Much below this value, the gaskets are given to excessive extrusion; much above it, they become too hard for the function they are meant to perform. Rubber, fabric reinforced rubber and synthetic rubbers such as silicone rubber or "Nordel"[1] hydrocarbon rubber are examples of materials that have been found to function well as the gasket material.

As illustrated, the substantially cylindrical member is a right circular cylinder. It is to be understood, however, that cylinders with cross sections of different shapes, such as square, rectangle or convoluted, are meant to be incorporated in the broad meaning of the term cylindrical as long as they serve a like function.

In the embodiment illustrated, conduit 17 is the tube-side fluid supply line and conduit 18 is the shell of a plastic tube heat exchanger. The plastic heat exchanger tubes 19 are bonded to themselves and to tube sleeve 20. The tube sleeve is then sealed between the two conduits as shown. One process for achieving a bond between the heat exchanger tubes and the tube sleeve is described in U.S. Pat. No. 3,315,740 issued to M. S. Withers on Apr. 25, 1967. Flange 21 is provided at the end of the cylindrical member housing the groove and the groove extends into this flange. This flange acts as a seat for the tube sleeve 20 and provides a means for forming a seal between the tube-side flow line 17 and the sleeve 20. To keep the tube sleeve 20 from pulling into the shell a split-ring retainer 22 is supplied.

[1] Registered trademark of E. I. du Pont de Nemours and Co.

The shell-side conduit 18 comprises a tube 23 to which a flange 24 is attached. Usually these parts are metal, so the attachment is made by a weld. If the shell-side fluid is corrosive, the shell-side conduit may be lined with a plastic sheath, or it may be made from a relatively impervious metal such as cast iron. The split-ring retainer and the heat exchanger tubes are held in place by member 11 which is sealed to the shell-side conduit by means of a retainer ring 25 adapted to mate with flange 24 of the shell-side conduit and compress gasket 16 and flange 13 between them. Compression is supplied by bolts 26, and the seal is made at the interface between flange 13 and flange 24. Gasket 16 plays no part in the actual sealing. Its sole purpose is to provide a resilient backing for the seal. The material from which the cylindrical member 12 is made generally has a coefficient of thermal expansion much greater than the material from which the conduits are made. As the temperature of the fluid flowing through the conduits increases, both the conduits and the sealing member will expand. Without the resilient gasket, flange 13 would be compacted by the force caused by the difference in expansion between it and the conduits and retainer ring. Aside from having a high coefficient of thermal expansion, those corrosion resistant thermoplastics most suitable to form the seal also take a set at high temperatures. The seal is still good at high temperatures, but when the temperature is reduced, the thermoplastic retains its set as the material around it contracts, and a leak develops. The purpose of the gasket 16 is to allow the thermoplastic of the cylindrical member 11 to expand more than the material surrounding it without being subject to sufficient compressive stress to cause a set to occur. It is for this reason that the gaskets must be made from materials which retain their resiliency over the range of temperature to which they are subjected.

Tube-side conduit 17 comprises a tube 27 and a flange 28 attached to it. Since the tube-side fluid is a corrosive fluid, the conduit is lined with a corrosion-resistant liner 29, made from a material similar to the material from which member 12 is made. The flange 28 is designed to mate with the grooved end of member 12 and compression of the seal is provided by bolts 30. As illustrated the series of bolts 26 and the series of bolts 30 alternate around the periphery of both flanges 24 and 28 and retainer ring 25 to provide compression at both ends of the seal. At the tube-side connector, the seal is formed between the liner 29 and the outer wall of flange 21, and between the tube sleeve 20 and the inner wall of flange 21, with the gasket again merely providing resiliency.

Since the seal is actually formed by compression, of the material in member 12, and since this compression must occur without substantial deformation of member 12, the machining tolerances on member 12 are stringent. To relieve this manufacturing difficulty slots 31 and 32 have been cut in member 12, providing some resiliency in the relatively rigid member itself.

Furthermore, since some compression of member 12 is bound to occur, especially at the end containing groove 14, a precaution has been taken to insure that compression is possible at that end without damaging that portion of flange 21 which does not contain gasket 15. This is accomplished by insuring that the gasket 14 is slightly wider than the groove into which it is placed. When the gasket is inserted into the groove, it does not fit all the way to the bottom of the groove, but lodges above the bottom of the groove, as shown, forcing the wall of the groove at the end of member 12 to spread. Thus, when compression first occurs, the seal is first formed at the point on the bottom of the gasket where the gasket fully bridges the groove. As compression continues, full contact between the gasket and walls of the groove, proceeds upward towards the outer periphery of member 12 leaving the solid base of the flange substantially free from destructive compression.

A number of variations and modifications are possible. For example, as illustrated in FIG. 2 flange 13 at the other end of member 12 may also contain a groove in which gasket 16, instead of being disposed behind the flange can be placed. In this case, the gasket should also be designed to spread the walls of the groove for maximum protection of member 12. Also gaskets 15 and 16 need not be made from the same material.

What is claimed is:

1. A corrosion-resistant sealing member, for connecting conduits, comprising:

a. a relatively rigid substantially cylindrical member made from a corrosion-resistant material deformable under applied pressure, said substantially cylindrical member having a first flange at one end thereof extending outward from its outer periphery and adapted to mate with a first one of said conduits, a first groove at the other end thereof extending inward from its outer periphery in a manner such as to provide a thin flexible wall between said first groove and the end of said substantially cylindrical member associated therewith and adapted to mate with a second one of said conduits, and a passage therethrough connecting both ends of said substantially cylindrical member;

b. a first circular gasket disposed within said first groove; and c. a second circular gasket disposed about the outer periphery of said substantially cylindrical member, abutting said first flange, said first and second circular gaskets being made from materials that are resilient over the range of temperature variation to which they are subjected.

2. The corrosion-resistant sealing member of claim 1 wherein the material of said substantially cylindrical member is thermoplastic.

3. The corrosion-resistant sealing member of claim 1 wherein the material from which said substantially cylindrical member is made comprises a polymer of tetrafluoroethylene.

4. The corrosion-resistant sealing member of claim 1 wherein the material from which said substantially cylindrical member is made comprises a copolymer of tetrafluoroethylene and hexafluoropropylene.

5. The corrosion-resistant sealing member of claim 1 wherein the material from which said first and second circular gaskets are made has a hardness of between 30 and 60 durometers.

6. The corrosion-resistant sealing member of claim 1 wherein the material of said substantially cylindrical member is thermoplastic, and wherein the material from which the said first and second circular gaskets are made has a hardness of between 30 and 60 durometers.

7. The corrosion-resistant sealing member of claim 1 wherein said first flange contains a second groove extending inward from the outer periphery thereof in a manner such as to provide a thin flexible wall between said second groove and the end of said substantially cylindrical member associated therewith, and wherein said second circular gasket is disposed within said second groove.

8. The corrosion-resistant sealing member of claim 1 wherein said first circular gasket has a width slightly greater than the width of said first groove, whereby, in an uncompressed state, said first circular gasket extends only part of the way to the bottom of said first groove and the wall of said first groove adjacent to the end of said substantially cylindrical member is forced outward from the end of said substantially cylindrical member, thereby allowing compression of said first circular gasket and the formation of a seal before destructive deformation of said substantially cylindrical member occurs.

9. The corrosion-resistant sealing member of claim 1 wherein said substantially cylindrical member further comprises a second flange, at the end thereof containing said first groove, extending inward from its inner periphery, thereby forming a z-shaped sealing member, and wherein the bottom of said first groove extends into said second flange.

10. The corrosion-resistant sealing member of claim 9 further comprising a separate split-ring retaining member adapted to mate with the end of said substantially cylindrical member containing said first flange in a manner such as to provide a rim extending from the inner periphery of said substantially cylindrical member, whereby a support groove for supporting a structure within said corrosion resistant sealing member is formed between said second flange and the rim formed by said split-ring retaining member.